(12) United States Patent
Schneiderbanger et al.

(10) Patent No.: US 8,153,274 B2
(45) Date of Patent: Apr. 10, 2012

(54) THERMAL BARRIER LAYER

(75) Inventors: Stefan Schneiderbanger, Lauterbach (DE); Ralf Stolle, Wolfratshausen (DE); Thomas Uihlein, Dachau (DE); Wolfgang Wachter, Munich (DE)

(73) Assignee: MTU Aero Engines GmbH, Munich (DE)

( * ) Notice: Subject to any disclaimer, the term of this patent is extended or adjusted under 35 U.S.C. 154(b) by 548 days.

(21) Appl. No.: 12/304,978

(22) PCT Filed: Jun. 12, 2007

(86) PCT No.: PCT/DE2007/001023
§ 371 (c)(1),
(2), (4) Date: Dec. 15, 2008

(87) PCT Pub. No.: WO2007/143973
PCT Pub. Date: Dec. 21, 2007

(65) Prior Publication Data
US 2009/0297876 A1    Dec. 3, 2009

(30) Foreign Application Priority Data

Jun. 16, 2006  (DE) .......................... 10 2006 027 728

(51) Int. Cl.
*B32B 15/04* (2006.01)
*B32B 18/00* (2006.01)
*F01D 5/28* (2006.01)

(52) U.S. Cl. ...... 428/633; 428/632; 428/701; 416/241 B
(58) Field of Classification Search .................. 428/633, 428/632; 416/241 B
See application file for complete search history.

(56) References Cited

U.S. PATENT DOCUMENTS

| 6,602,814 | B1 * | 8/2003 | Gadow et al. ................. 501/152 |
| 2004/0012152 | A1 * | 1/2004 | Grunke et al. ................ 277/415 |
| 2007/0248764 | A1 * | 10/2007 | Friedrich et al. ........... 427/419.2 |

FOREIGN PATENT DOCUMENTS

| DE | 100 08 861 A1 | 9/2001 |
| DE | 103 22 339 A1 | 12/2004 |
| EP | 1 060 281 | 12/2000 |
| EP | 1 375 696 A2 | 1/2004 |
| WO | WO 99/42630 | 8/1999 |
| WO | WO 2005/083155 A1 | 9/2005 |
| WO | WO 2005/116295 A1 | 12/2005 |
| WO | WO 2007/016906 A1 | 2/2007 |

* cited by examiner

*Primary Examiner* — Aaron Austin
(74) *Attorney, Agent, or Firm* — Crowell & Moring LLP

(57) ABSTRACT

A thermal barrier layer for metallic components, in particular for gas turbine components which are subject to high temperatures or hot gas, is disclosed. The thermal barrier layer includes an inner contact layer and an outer top layer, where the inner contact layer is applied to a surface of the component via an adhesion-promoting layer that is disposed therebetween, and between the outer top layer and the inner contact layer an intermediate layer is formed.

14 Claims, 1 Drawing Sheet

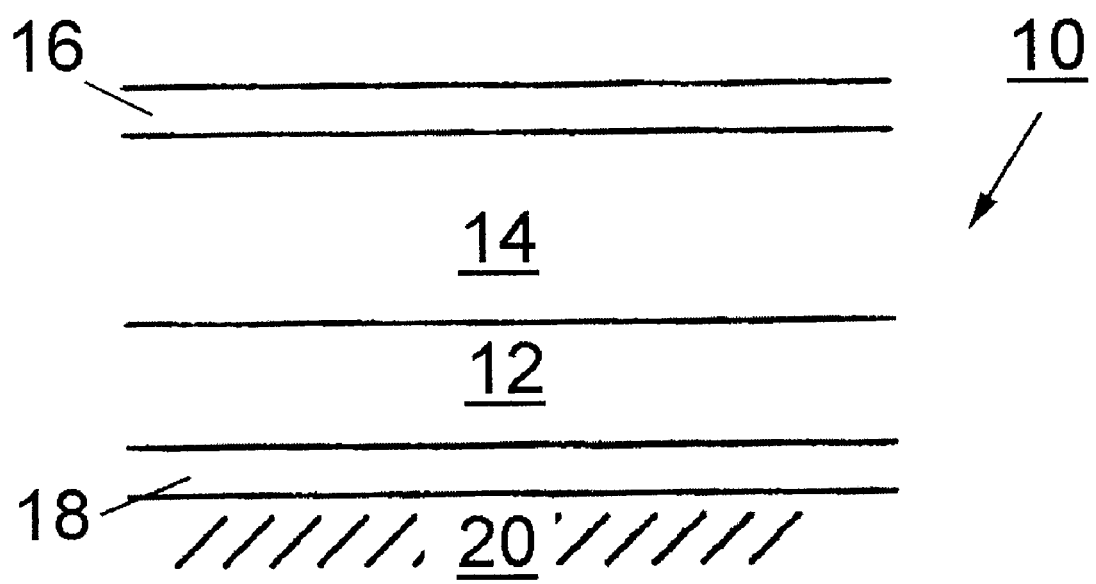

THERMAL BARRIER LAYER

This application claims the priority of International Application No. PCT/DE2007/001023, filed Jun. 12, 2007, and German Patent Document No. 10 2006 027 728.7, filed Jun. 16, 2006, the disclosures of which are expressly incorporated by reference herein.

BACKGROUND AND SUMMARY OF THE INVENTION

The invention relates to a thermal barrier layer for metallic components, in particular for gas turbine components which are subject to high temperatures or hot gas, with an inner layer contact layer and an outer top layer, wherein the inner contact layer is applied to a surface of the component via an adhesion-promoting layer that is disposed therebetween. In addition, the invention relates to a component with such a thermal barrier layer.

Metallic components of a gas turbine are provided with thermal barrier layers for protection against high temperatures and hot gas. German Patent Document No. DE 100 08 861 A1 discloses a thermal barrier layer system for a metallic component, wherein the thermal barrier layer system is comprised of a contact layer and a top layer. The contact layer is situated between an adhesion-promoting layer and the top layer, wherein the adhesion-promoting layer is applied to the component. According to DE 100 08 861 A1, the contact layer of the thermal barrier layer is comprised completely or predominantly of zirconium oxide that is partially stabilized with $Y_2O_3$ or of a glass-metal composite material; the top layer is comprised of fully stabilized, cubic zirconium oxide ($ZrO_2$). In addition, experiments were conducted with thermal barrier layers made of lanthanum hexaaluminate (LaHA) (European Patent Document No. EP 1 060 281 B1). The latter, however, show evidence of an erosion resistance that is too low as compared to zirconium oxide. As a result, the use of LaHA in particular as a thermal barrier layer is only possible in a very limited manner.

Therefore, the objective of the present invention is providing a thermal barrier layer of the type cited at the outset, which has a considerably improved erosion resistance.

It is furthermore the objective of the present invention to provide a generic component, which features a considerably improved erosion resistance.

An inventive thermal barrier layer for metallic components, in particular for gas turbine components which are subject to high temperatures or hot gas, has an inner layer contact layer and an outer top layer, wherein the inner contact layer is applied to a surface of the component via an adhesion-promoting layer that is disposed therebetween. According to the invention, an intermediate layer is formed between the outer top layer and the inner contact layer, wherein the intermediate layer is formed from a material comprising at least one component with at least one phase which stoichiometrically contains 1 to 80 mole percent of $Mx_2O_3$, 0.5 to 80 mole percent MyO, and the rest being $Al_2O_3$ with random impurities, wherein Mx is selected among the elements lanthanum, chromium, barium, neodymium, or mixtures thereof, and wherein My is selected among the alkaline earth metals, transition metals, and the rare earths, or mixtures thereof, preferably from among magnesium, zinc, cobalt, manganese, iron, nickel, chromium, europium, samarium, or mixtures thereof, and the inner contact layer and the outer top layer are made from a zirconium oxide which is partially stabilized by means of yttrium, yttrium oxide, calcium, or magnesium. In this case, according to an embodiment of the invention, $Mx_2O_3$ can be embodied as $La_2O_3$ and MyO as MgO in the intermediate layer, wherein the phase is a hexaaluminate phase of the magnetoplumbite structure. The intermediate layer in this case is comprised in particular of lanthanum hexaaluminate, in particular of doped lanthanum hexaaluminate. Through the inventive structure of the thermal barrier layer it is possible to utilize the advantages of the intermediate layer that is considerably more sinter-stable as compared to zirconium oxide, in particular that is comprised of lanthanum hexaaluminate, to the full degree in building aircraft engines and at the same time achieve a high erosion resistance guaranteed by the outer top layer. In addition, in the case of the inventive thermal barrier layer, an additional phase boundary is formed between the outer top layer and the intermediate layer. This acts as an imperfection and significantly reduces the conduction of heat in the thermal barrier layer.

In another advantageous embodiment of the inventive thermal barrier layer, the adhesion-promoting layer applied to the metallic component is embodied to be metallic and preferably as an aluminum diffusion layer or as a platinum aluminum diffusion layer or as an MCrAlY application layer. The adhesion-promoting layer increases the adhesion of the thermal barrier layer on the metallic component.

In another advantageous embodiment of the inventive thermal barrier layer, the outer top layer features a layer thickness between 1 and 250 μm, in particular between 10 and 200 μm, the intermediate layer features a layer thickness between 30 and 2250 μm, in particular between 50 and 2000 μm, the inner contact layer features a layer thickness between 1 and 2250 μm, in particular between 1 and 2000 μm, and the adhesion-promoting layer features a layer thickness between 1 and 650 μm, in particular between 1 and 500 μm. Due to the selection of the layer thickness of the outer top layer, it is advantageously guaranteed that, even in the case of the occurrence of (micro) fissures in the top layer after long operating times with high operating temperatures, it will not result in a further mechanical disintegration of the overall system or the thermal barrier layer.

An inventive component, in particular a component of a gas turbine such as an aircraft engine, with an adhesion-promoting layer applied to a metallic component surface and a thermal barrier layer applied at least partially to the adhesion-promoting layer is comprised of a metallic substrate and an inventive thermal barrier layer that is applied at least partially to the metallic substrate, as described in the foregoing. A correspondingly coated component has a considerably lower wear rate with a correspondingly higher service life due to the clear reduction in the thermal conductivity and a likewise significantly increased erosion resistance of the thermal barrier layer according to the present invention.

The inventive thermal barrier layer or its individual constituents and individual layers are preferably applied to the component by thermal spraying or by a PVD (physical vapor deposition) or EB-PVD (electron beam physical vapor deposition) process or a CVD (chemical vapor deposition) process. Other methods are also conceivable. The person skilled in the art being addressed here is familiar with the individual methods for applying the layers and, therefore, they do not require any more detailed explanation.

Additional advantages, characteristics, and details of the invention are disclosed in the following description of a graphically depicted exemplary embodiment.

BRIEF DESCRIPTION OF THE DRAWING

The FIGURE shows a schematic illustration of an embodiment of the present invention.

DETAILED DESCRIPTION OF THE DRAWING

In this case, the FIGURE shows in a heavily schematized manner a metallic component 20 of a gas turbine, wherein an adhesion-promoting layer 18 is applied to a surface of the component 20. A thermal barrier layer 10 is applied to the adhesion-promoting layer 18, wherein the thermal barrier layer 10 is comprised of an inner contact layer 12, an intermediate layer 14, and an outer top layer 16.

The inner contact layer 12 and the top layer 16 are comprised in this case of a zirconium oxide layer that is partially stabilized with yttrium, yttrium oxide, calcium, or magnesium. The intermediate layer 14 is embodied of lanthanum hexaaluminate in accordance with the exemplary embodiment. The lanthanum hexaaluminate in this case is preferably stabilized with magnesium or even manganese.

Because of the overall four-layered structure of the thermal barrier layer 10 from the metallic adhesion-promoting layer 18, the contact layer 12 of partially stabilized zirconium oxide, the intermediate layer 14 of lanthanum hexaaluminate, and the top layer 16 of partially stabilized zirconium oxide, it is achieved that the thermal coefficients of expansion between the individual layers are adapted to one another. Stresses within the thermal barrier layer 10 are thereby minimized.

The invention claimed is:

1. A thermal barrier layer for a metallic component, comprising:
    an inner contact layer;
    an intermediate layer; and
    an outer top layer,
        wherein the inner contact layer is applied to a surface of the component via an adhesion-promoting layer that is disposed therebetween,
        wherein between the outer top layer and the inner contact layer the intermediate layer is formed,
        wherein the intermediate layer is formed from a material comprising at least one component with at least one phase which stoichiometrically contains 1 to 80 mole percent of $Mx_2O_3$, 0.5 to 80 mole percent MyO, and the rest being $Al_2O_3$ with random impurities,
        wherein Mx is selected among lanthanum, chromium, barium, neodymium, or mixtures thereof, and wherein My is selected among alkaline earth metals, transition metals, and rare earths, or mixtures thereof, and
        wherein the inner contact layer and the outer top layer are made from a zirconium oxide which is partially stabilized by yttrium, yttrium oxide, calcium, or magnesium.

2. The thermal barrier layer according to claim 1, wherein the My is selected from among magnesium, zinc, cobalt, manganese, iron, nickel, chromium, europium, samarium, or mixtures thereof.

3. The thermal barrier layer according to claim 1, wherein the $Mx_2O_3$ is $La_2O_3$ and the MyO is MgO in the intermediate layer.

4. The thermal barrier layer according to claim 1, wherein the intermediate layer is formed of lanthanum hexaaluminate.

5. The thermal barrier layer according to claim 4, wherein the intermediate layer is formed of doped lanthanum hexaaluminate.

6. The thermal barrier layer according to claim 1, wherein the adhesion-promoting layer is metallic.

7. The thermal barrier layer according to claim 1, wherein the adhesion-promoting layer is an aluminum layer or a platinum-aluminum layer or a MCrAlY layer.

8. The thermal barrier layer according to claim 1, wherein the component is metallic.

9. The thermal barrier layer according to claim 1, wherein the outer top layer has a layer thickness between 1 and 250 µm.

10. The thermal barrier layer according to claim 1, wherein the intermediate layer has a layer thickness between 30 and 2250 µm.

11. The thermal barrier layer according to claim 1, wherein the inner contact layer has a layer thickness between 1 and 2250 µm.

12. The thermal barrier layer according to claim 1, wherein the adhesion-promoting layer has a layer thickness between 1 and 650 µm.

13. A component with an adhesion-promoting layer applied to a metallic component surface of the component and a thermal barrier layer applied at least partially to the adhesion-promoting layer, wherein the thermal barrier layer is embodied in accordance with claim 1.

14. A metallic component, comprising:
    an outer surface of the component; and
    a thermal barrier layer, including an inner contact layer, an intermediate layer, and an outer top layer, wherein the inner contact layer is applied to the outer surface of the component via an adhesion-promoting layer that is disposed therebetween, and wherein the intermediate layer is formed between the outer top layer and the inner contact layer;
    wherein the intermediate layer is formed from a material comprising at least one component with at least one phase which stoichiometrically contains 1 to 80 mole percent of $Mx_2O_3$, 0.5 to 80 mole percent MyO, and $Al_2O_3$ with random impurities;
        wherein Mx is selected among lanthanum, chromium, barium, neodymium, or mixtures thereof;
        wherein My is selected among alkaline earth metals, transition metals, and rare earths, or mixtures thereof; and
        wherein the inner contact layer and the outer top layer are made from a zirconium oxide which is partially stabilized by yttrium, yttrium oxide, calcium, or magnesium.

\* \* \* \* \*